United States Patent [19]
Howland

[11] 3,749,425
[45] July 31, 1973

[54] TAKE-OFF DUCT COUPLER
[76] Inventor: William R. Howland, 4215 Indian Rd., Kearney, Nebr.
[22] Filed: Nov. 4, 1971
[21] Appl. No.: 195,651

[52] U.S. Cl. .............................. 285/191, 285/332.1
[51] Int. Cl. ................................................ F16l 5/00
[58] Field of Search .................. 285/141, 185, 123, 285/200, 205, 332, 332.1; 222/569, 90

[56] References Cited
UNITED STATES PATENTS

| | | | |
|---|---|---|---|
| 1,641,839 | 9/1927 | Cain et al. ...................... | 285/332 X |
| 1,429,739 | 9/1922 | Jacobs ............................ | 285/191 X |
| 1,221,901 | 4/1917 | Pearch ............................ | 285/191 |
| 2,736,577 | 2/1956 | Mackey .......................... | 285/191 X |
| 597,497 | 1/1898 | Gundermann ................. | 285/334.5 X |

FOREIGN PATENTS OR APPLICATIONS
247,320  9/1963  Australia............................ 285/191

Primary Examiner—Dave W. Arola
Attorney—Johnston, Root, O'Keefe, Keil, Thompson and Shurtleff

[57] ABSTRACT

A coupling device for attachment of a take-off duct to an air supply duct embodying an inner ring collar having a rearward flange, an intermediate, substantially cylindrical portion extending through an opening in the supply duct and a tapered neck portion preferably formed as a substantially frusto-hyperboloid; a second ring collar having a rearward ring portion of larger diameter than that of the aforesaid cylindrical portion, an intermediate portion with a taper substantially mating the taper of the aforesaid neck portion and a forward, substantially cylindrical duct-coupling portion; and a bolt-and bridge-assembly for holding said collars in assembled relationship on the supply duct.

2 Claims, 4 Drawing Figures

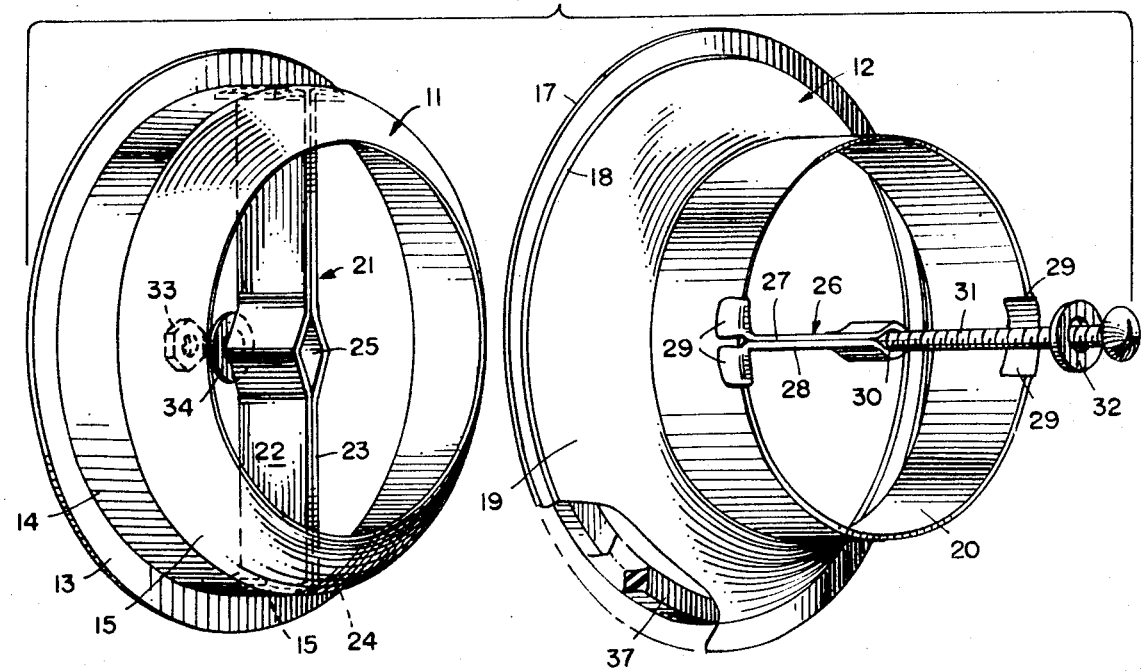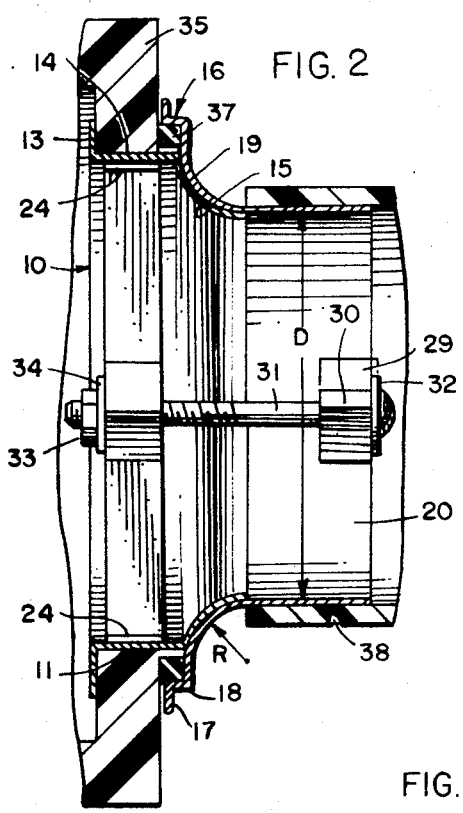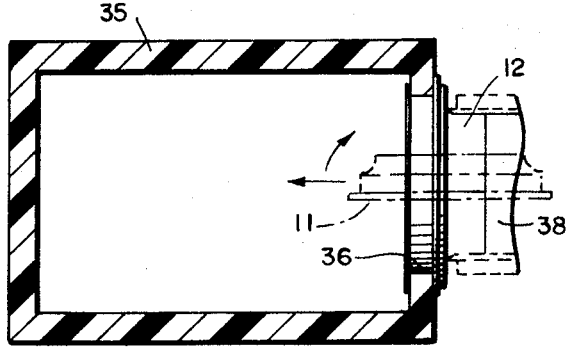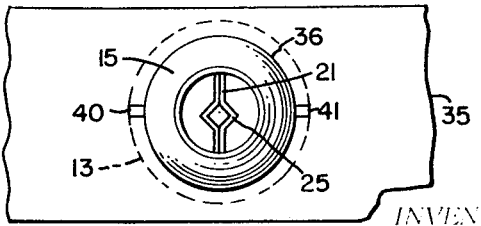

TAKE-OFF DUCT COUPLER

INTRODUCTION

The subject invention concerns a coupling device for quickly mounting in air supply ducts the take-off collar or ring to which the take-off duct is coupled. Take-off collars or rings have been used for many years for this purpose. Such collars or rings are normally attached to the supply duct by means of sheet metal screws or other suitable attaching means. The take-off ducts usually are circular or rectangular in cross section and may constitute flexible ducts or rigid sheet metal ducts.

In recent years supply ducts made of metal foil-lined fiber glass walls have gained acceptance by architects and builders. The fiber glass ducts provide thermal insulation and also absorbency of sound and vibrations in air distribution systems. It is not practical to attach take-off rings or collars to such ducts by conventional fastening means, e.g., screws or bolts, because of the structural weaknesses of the fiber glass walls in terms of their holding power for such fastening means.

THE INVENTION

The subject invention concerns improvements in coupling devices useful for attachment of take-off ducts to air supply ducts. While the invention is particularly advantageous for use with the aforesaid fiber glass ducts, it can also be used with supply ducts made of other metals, e.g., sheet metal, sheet metal lined with noise and vibration absorbing material and the like.

Briefly, the invention provides the combination of a first ring collar and a second ring collar matingly coupled thereto. The first ring collar has a rearward flange adapted to bear against the inner face of the supply duct about the air take-off opening cut therein. It has an intermediate cylindrical portion extending through the supply duct opening and a tapered, forward neck portion. This neck portion preferably has substantially the shape of a frusto-hyperboloid.

The second ring collar has a rearward ring portion of larger diameter than the diameter of the aforesaid intermediate, substantially cylindrical portion. Preferably it comprises a rearward flange adapted to bear against the outer face of the supply duct around the opening and a substantially cylindrical portion providing a space into which is incorporated a compressible gasket. The latter provides a positive seal against escapement of air from the coupling device.

The second collar further comprises an intermediate portion having a taper substantially mating with the taper of the neck portion of the first collar and provides a close fit therebetween. Such taper preferably is the aforesaid substantially frusto-hyperboloid. The forward portion of the second collar comprises a substantially cylindrical coupler portion adapted for the coupling thereon of a cylindrical take-off duct or an adapter having a cylindrical portion in the event the take-off duct is a shape other than cylindrical.

The take-off opening in the supply duct has a diameter less than the outer diameter of the rearward flange of the first collar. With a supply duct made of metal foil-lined fiber glass, a first collar may be forced through the take-off duct opening at an angle to the opening, the aforesaid flange forming small slits as the collar is forced through the opening. Once inside the supply duct, the first collar is positioned in the opening with its intermediate, substantially cylindrical portion projecting through the opening.

The second collar is then placed concentrically over the first collar. A bolt is inserted through the two axially central passages in the respective bridges of the two collars and a nut is threaded onto the bolt and tightened until the respective collars are seated securely on the supply duct. Thereafter the take-off duct is coupled to the neck portion of the second collar.

THE DRAWING

The preferred embodiment of the invention is illustrated in the drawing wherein:

FIG. 1 is an exploded, perspective view of the preferred embodiment of the coupling device of the invention;

FIG. 2 is a diametric cross section of the assembled collars of the embodiment mounted on a fiber glass supply duct, shown in fragment, with a take-off duct, also shown in fragment, mounted on the neck of the second collar;

FIG. 3 is a semi-diagrammatic side elevation, with the supply duct in cross section, illustrating in phantom the technique for inserting the first collar in the supply duct;

FIG. 4 is a fragmentary front elevation of the fiber glass supply duct with the first collar mounted in a circular hole in the wall of said duct.

THE PREFERRED EMBODIMENT

Referring to the drawings, the illustrated take-off collar 10 comprises an inner collar 11 and an outer collar 12. The inner collar 11 has a rearward flange 13, a substantially cylindrical intermediate portion 14 and a tapered neck portion 15. The latter preferably has a taper provided by a concavo-convex ring wall which is substantially a frusto-hyperboloid or truncated hyperboloid.

The second, outer collar 12 comprises a narrow, rear portion 16 which is preferably composed of a substantially cylindrical segment 18 having at its rearward edge a flange 17. Its next portion is the tapered intermediate portion 19, the taper of which is substantially mating with that of the taper of the neck portion 15, the neck portion 15 and intermediate portion 19 being concentric. The remainder of the second collar 12 is a substantially cylindrical neck portion 20.

Each of the collars may be made from sheet metal in the form of metal spinnings. This technique is preferred to stamping or other metal forming operations for purposes of obtaining a close fit between the tapers of the neck portion 15 and intermediate portion 19. If desired, however, the respective collars may be made by plastic molding or the like.

The inner collar 11 has a bridge 21 fixedly mounted therein. In the illustrated embodiment, the bridge 21 is formed by two, side-by-side, diametric bars 22 and 23 respectively having ears 24 which are spot-welded or otherwise suitably attached to the inner face of the substantially cylindrical intermediate portion 14. The bars 23 and 24 are bent at their center portions to provide axially central, bolt-receiving passage 25 at the axially central portion of the bridge 21.

The outer collar 12 has a similar bridge 26 composed of the side-by-side, diametric bars 27 and 28. The latter have ears 29 which are spot-welded or otherwise fixedly attached to the inner face of the substantially cylindrical neck portion 20. Bends in the central portion of the bars 27 and 28 provide an axially central, bolt-receiving passage 30 in substantial axial alignment with the passage 25 of the bridge 21.

The two collars are held in assembled relationship by a bolt 31, the shank of which extends through the passages 25 and 30. The bolt hardware includes the two washers 32 and 34 and a nut 33 threaded on the bolt.

The two collars are mounted on a supply duct in the assembled relationship shown in FIG. 2 in and about a round hole 36 cut in a planar face or side of the supply duct 35. In the illustrated embodiment, the supply duct 35 is a metal foil-lined, rectilinear, fiber glass body comprising glass filaments or fibers bonded together by a thermoplastic polymer binder. The round hole 36 is cut at a diameter equal to or just slightly larger than the diameter of the substantially cylindrical intermediate portion 14 of the first collar 11. The latter is inserted inside the duct 35 by placing it at an angle relative to the plane of the hole 36 and pushing it through the hole. The flange 13, having a greater diameter than that of the hole 36, cuts narrow, substantially diametrically opposed slits (not illustrated) in the relatively soft fiber glass material as the first collar is pushed into the duct 35.

After insertion of the inner collar 11 into the supply duct, it is positioned in the round hole 36 with its substantially cylindrical intermediate portion 14 seated in the round hole and its flange 13 seated against the inner face of the duct wall about the hole 36.

The second collar 12 is then mounted coaxially over the first collar, and the bolt 31 is inserted through the passages 30 and 25 with the washer 32 beneath the bolt head. Reaching by hand through the two collars, the installer then places the washer 34 and nut 33 on the shank end of the bolt. The bolt and nut are then tightened to draw the two collars together in assembled relationship.

The substantial mating fit of the neck portion 15 of the first collar and the tapered intermediate portion 19 of the second collar provide a substantially air-tight seal. If desired, however, a ring gasket 37 may be provided in the rear portion 16 of the outer collar 12, said gasket ring being compressed against the outer face of the duct 35 about the hole 36 to further enhance the air-tightness of the duct and coupler assembly.

The unit is now ready for mounting thereon of a substantially cylindrical take-off duct 38 about the substantially cylindrical neck portion 20 of the outer collar. Such take-off duct may be a sheet metal duct, a flexible conduit or the like. In the alternative, the member 38 may be the cylindrical portion of an adapter for connection of the coupling unit of the invention with a take-off duct of cross-sectional configuration other than circular.

The radii of curvature R for the two substantially frusto-hyperboloid segments 15 and 19 are approximately 0.2 of the diameter D of the passage of cylindrical neck portion 20, according to the recognized formula $R = 0.2\ D$ used to eliminate Vena Contracta and reduce pressure drop.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A coupling device comprising a first ring collar having (a) a rearward flange, (b) an intermediate, substantially cylindrical portion and (c) a forward, neck portion constituting a concavo-convex ring wall which is substantially a frustohyperboloid; a second ring collar having (a') a rearward ring portion of larger diameter than that of said intermediate, substantially cylindrical portion, (b') an intermediate portion constituting a concavo-convex ring wall which is substantially a frusto-hyperboloid substantially mating with said ring wall constituting said neck portion to provide a close, sealing fit therebetween, and (c') a forward, substantially cylindrical coupler portion adapted for coupling thereon a take-off duct; first and second bridge means respectively extending diametrically across said intermediate portion (b) and said coupler portion, apertures in the center portions of said bridge means, and fastening means extending through said apertures to draw said collars together with said neck portion (c) and said intermediate portion (b') in coaxial, sealing contact.

2. An air supply duct having a planar wall with a round air take-off hole therein, said planar wall being relatively soft fiber glass material, and a coupling device mounted in said hole, said coupling device constituting a first ring collar having (a) a rearward flange, (b) an intermediate, substantially cylindrical portion and (c) a tapered, forward, neck portion; a second ring collar having (a') a rearward ring portion of larger diameter than that of said intermediate, substantially cylindrical portion, (b') an intermediate portion with a taper substantially mating with the taper of said neck portion to provide a close fit therebetween, and (c') a forward, substantially cylindrical coupler portion adapted for coupling thereon a take-off duct; and connecting means joining said collars for drawing together said collars with said neck portion (c) and said intermediate portion (b') in coaxial, close fitting relationship, said planar wall having substantially diametrically opposed, narrow slits cut therein adjacent said hole by said flange when said first ring collar is placed at an angle relative to the plane of said hole and pushed therethrough, said rearward flange (a) being seated against the inner face of said wall about said hole and with said rearward portion (a') positioned substantially against the outer face of said wall about said hole.

* * * * *

UNITED STATES PATENT OFFICE
CERTIFICATE OF CORRECTION

Patent No. 3,749,425   Dated July 31, 1973

Inventor(s) William R. Howland

It is certified that error appears in the above-identified patent and that said Letters Patent are hereby corrected as shown below:

Column 3, line 23, "(not illustrated)" should read -- 40 and 41 (FIG. 4) --.

Signed and sealed this 23rd day of July 1974.

(SEAL)
Attest:

McCOY M. GIBSON, JR.
Attesting Officer

C. MARSHALL DANN
Commissioner of Patents